United States Patent [19]

Zimmer

[11] Patent Number: 4,797,668

[45] Date of Patent: Jan. 10, 1989

[54] ACOUSTIC WELL LOGGING SYSTEM HAVING MULTIPLEXED FILTER DIGITIZING

[75] Inventor: Mark D. Zimmer, Katy, Tex.

[73] Assignee: Halliburton Company, Duncan, Okla.

[21] Appl. No.: 941,133

[22] Filed: Dec. 12, 1986

[51] Int. Cl.$^4$ .............................................. G01V 1/40
[52] U.S. Cl. ...................................... 340/857; 367/45; 367/81
[58] Field of Search .................. 367/34, 43, 25, 44, 367/27, 81, 45, 82, 46, 912; 364/422, 724; 340/857, 853, 856, 858; 455/307

[56] References Cited

U.S. PATENT DOCUMENTS

| | | | |
|---|---|---|---|
| 2,207,398 | 7/1940 | Floyd | 367/49 |
| 2,716,733 | 10/1955 | Roark | 367/45 |
| 3,281,776 | 10/1966 | Ruehle | 367/45 |
| 3,312,933 | 4/1967 | Lawrence et al. | 367/46 |
| 3,701,091 | 10/1972 | Lenihen | 367/45 |
| 4,535,417 | 8/1985 | Peacock | 367/45 |
| 4,628,491 | 12/1986 | Bodine et al. | 367/45 |
| 4,672,588 | 6/1987 | Willen | 367/28 |
| 4,701,892 | 10/1987 | Anderson | 367/35 |

OTHER PUBLICATIONS

SPE 7446, "Formation Compressional & Shear Interval Transit Time Logging by Means of Long Spacing & Digital Techniques," Aron et al., 10/78.

Primary Examiner—Thomas H. Tarcza
Assistant Examiner—Ian J. Lobo
Attorney, Agent, or Firm—William J. Beard

[57] ABSTRACT

In an acoustic well logging system having an acoustic transmitter in a sonde and spaced acoustic receivers, an acoustic transmitter control circuit enabling transmission of high frequency pulses, acoustic receivers therefor, received signal frequency filter selector means and a digital signal processing system assist in data processing. The received signal is passed through high and low frequency filters, the filters being selectively switched, the signals are converted to digital form and then available for further processing.

10 Claims, 2 Drawing Sheets

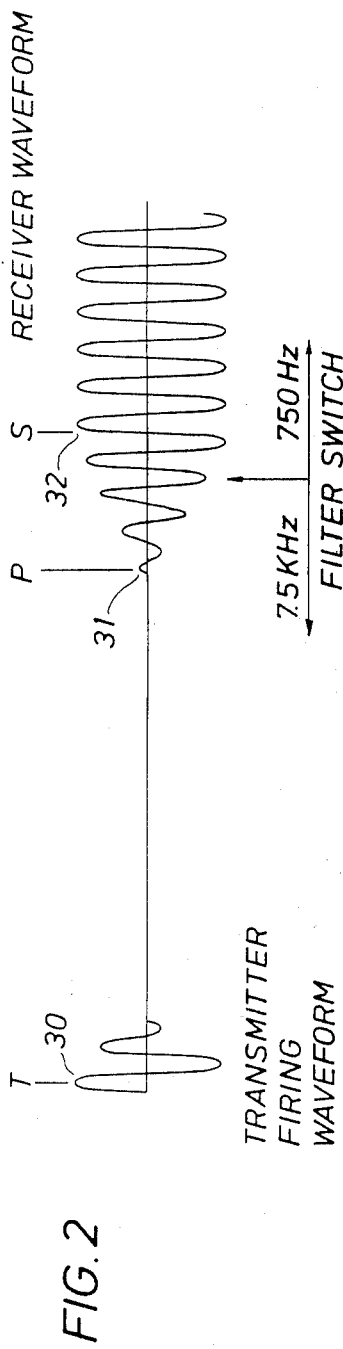

ACOUSTIC WELL LOGGING SYSTEM HAVING MULTIPLEXED FILTER DIGITIZING

BACKGROUND OF THE DISCLOSURE

This invention relates to acoustic well logging and, more particularly, to digitized full wave form acoustic well logging.

In recent years it has become desirable in the field of acoustic well logging, in order to provide more information about earth formations traversed by a well borehole, to digitize the full received wave form of an acoustic signal transmitted from an acoustic transmitter to an acoustic receiver over a relatively long spaced distance in the well borehole. For example, it is not uncommon in acoustic logging to have long spaced acoustic well logging sondes having the transmitter and receiver separated by distances of at least ten feet. This is in direct contrast to prior art systems which used relatively short spacings from exclusively acoustic transmitter and receiver pairs to perform acoustic velocity logging of earth formations in the vicinity of a well borehole.

In acoustic velocity logging it was not necessary to retain or to know the entire wave form of the acoustic signal received at each receiver. Rather it was desired only to detect the onset of the compressional wave or P wave which arrived at a receiver from a particular transmitter firing. The remainder of the acoustic wave form which contained shear waves and other acoustic propagation wave modes such as Raleigh waves or tube waves was considered relatively unimportant in the prior art.

It has been discovered, however, in relatively recent years that it is highly desirable to space an acoustic transmitter a relatively long distance from a plurality of acoustic receivers. Such a system can be used to record, in digital form, the acoustic wave forms arriving at each of a plurality of acoustic receivers. The long spacing between the transmitter and acoustic receivers allows time separation of the various modes of acoustic energy propagation to occur at the receiver due to the difference in transmission velocities of these different transmission modes in the earth formations and the borehole.

Previously, with short spaced acoustic transmitters and receivers, there was inadequate time separation of the various acoustic modes arriving at the receiver because the propagatin velocities were not sufficiently different to prevent interference at the receiver from one acoustic mode to another. However, using longer spaced acoustic transmitters and receivers has enabled the propagation of the waves over the longer distance to further separate in time the various acoustic modes of propagation due to the differences in propagation speed over the greater distance between the transmitter and receiver as these different modes of acoustic signals pass from the transmitter into the earth formations and along the boundaries of the well borehole and thence back into the distantly spaced acoustic receivers propagation speed difference effectively filter or separate the modes.

The more distant spacing of acoustic receivers from a transmitter, however, leads to further difficulties in obtaining a good quality acoustic well log. For example, acoustic transmitters must be made much more energetic than in the prior art in order to provide high signal to noise ratios of acoustic energy arriving at the more distantly spaced receivers. Moreover, so called road noise generated by the movement of the acoustic well logging sonde through the borehole and by electronic noise generated within the tool itself and other noises created by movement of the logging cable or vibrations being propagated down the logging cable or vibrations being propagated down the logging cable from the surface become more important in masking the relatively weaker arriving signals from the acoustic transmitter at each of the long spaced plurality of acoustic receiving transducers.

While it is true that information concerning the mechanical rock charcteristics of the earth formations can be derived from the full wave form acoustic logs of modern day acoustic long-spaced well logging instruments, it is also true that it is highly desirable to be able to still produce the so called Delta T log or log of travel time from the transmitter to an acoustic receiver of the compressional or P wave in the earth formation surrounding the well borehole. This is because a long known relationship has been developed for directly relating the acoustic travel time or velocity of propagation of P waves to the porosity of the earth formations in the vicinity of a well borehole. Particularly in very hard earth formations having fast propagation travel times, the acoustic P wave is carried or radiated away from the well borehole very efficiently when the transmitter is fired. This leads to relatively low amplitude arrivals of P waves at the distantly spaced acoustic receivers. P amplitudes are low only relative to later arrivals. If the entire waveform is to be recorded without clipping. The P waves appear small. P amplitudes in hard rock are still much larger than in soft or porous formations. Usually a technique involving the zero crossing detection of the oscillating acoustic wave form or the selection of a peak amplitude of first arrival is used for this purpose. However, the wide dynamic range requirement on the amplifiers and preamplifiers connected to the acoustic well logging receiving transducers become very stringent in these cases. Thus very low amplitude or relatively low amplitude road noise which occurs in the passage of the well logging instrument through the borehole can lead to severe difficulties in detecting the relatively low amplitude arrival of P waves in particularly in hard rock formations.

In the past it has been possible to make separate well logging runs using different relative amplification levels and different frequency filters tailored for the specific purpose of passing either relatively high frequency or relatively low frequency acoustic signals through the electronic systems to the digitizers. For example, in detecting the onset of the P wave arrivals, the high frequency components of the signal are the most desirable ones to detect. Relatively low frequency components can be shunted aside or filtered out for this purpose. That such filtering can be performed is due to the fact that most road noise caused by tool movement in the borehole or vibrational energy propagated down the well logging cable into the borehole occurs at much lower frequncies than the transmitted acoustic signal from the acoustic transmitter to the receivers. This is a much higher frequency than that of true naturally occurring noise due to movement of the well logging tool and cable in the borehole. The transmitter frequency is selected to put as much energy as possible into the borehole and to excite all modes of propagation. Lower frequency transmitters cause better excitation of Stoneley waves, etc. Lower frequency transmitters also mean road noise and signal frequencies can sometimes overlap, however, the bulk of road noise is below S signal frequency.

BRIEF DESCRIPTION OF THE INVENTION

Accordingly, the present invention includes an acoustic well logging system having a relatively long spaced acoustic transmitter and a plurality of acoustic receivers. The system contains electronic components capable of filtering out relatively low frequency road noise for the period of time from the transmitter firing to the first arrival of the P wave or compressional wave wave form at an acoustic receiver. Once the compressional wave form of P wave arrival has been detected at the receiver a digitally controlled multiplexer changes the frequency response of the system to permit much lower frequencies from the acoustic receiver to reach the analog to digital converter and the gain ranging amplifiers of the system. This enables a high fidelity reproduction and digitization of the full acoustic wave form at the receiver. In particular, the received signal prior to the onset of the detection of the P wave or compressional wave form is supplied to the multiplexer via a 7.5 kilohertz high pass filter. An auto gain ranging amplifier is used to amplify this signal and supply it as an input to an Analog to Digital (A-D) converter. Once the onset of the compressional wave has been detected so that the Delta T log or acoustic travel time log may be produced, the signals from the receiver are routed to the digitizing portion of the system via a much lower frequency cut off high pass filter having a cutoff frequency of approximately 750 hertz. This enables the high fidelity reproduction of the acoustic wave form when it is digitized and stored in the memory of the computer. Such lower frequency components may then be utilized in determining the rock properties of earth formation in the vicinity of the well borehole.

BRIEF DESCRIPTION OF THE PRIOR ART

U.S. Pat. No. 4,535,417, to Peacock discloses a digital time variant Hilbert transform filter for use in processing seismic data. The cutoff frequency of this Hilbert transform filter is varied as a function of time by a swept frequency control signal so that in a preferred embodiment the cutoff frequency of a low pass filter is progressively lowered with increasing time in order to reject the high frequency components of the return seismic signal. In seismic exploration, high frequency seismic signals are attenuated by the earth formations more quickly than low frequency seismic signals. Hence, later occurring high frequency signals contain a higher percentage of noise. Accordingly, the cutoff frequency of the filter is progressively lowered to improve the signal to noise ratio of the seismic signal.

U.S. Pat. No. 3,701,091 to Lenihan discloses a time variant filter for filtering seismic data also. A set of filters each having a different frequency response is included to provide time variant filtering. The frequency response of the input filters are varied as a function of time. Interpolation filters are provided between adjacent input filters to provide a smooth transition between the input filters.

U.S. Pat. No. 2,716,733 to Roark discloses a variable bandwidth band pass filter for use in seismic prospecting. In FIG. 1 of this patent, a plurality of narrow band filters 16-20 reconnected in parallel by suitable selection of switches 26-30. The outputs of the narrow band filters 16-20 may be added together in any desired combinations.

It may be seen, however, that no system for use in acoustic well logging and having a multiplexed variable high pass frequency filter is disclosed in these prior art references which the Applicant hereby incorporates by reference into the subject application. Other seismic prospecting patents which are related to switchable filters or time varied filters are cited as a matter of interest herein and include U.S. Pat. Nos. 3,281,776 to Ruehle and 3,312,933 to Lawrence et al. None of these variable frequency filter seismic patents are directly applicable to the types of problems encountered in acoustic well logging, particularly full wave digital acoustic logging. It is respectfully submitted that the present disclosure describes an invention clearly and patentably distinct therefrom.

BRIEF DESCRIPTION OF THE DRAWINGS

The foregoing descriptions of the problems and approaches to solving these problems in the present invention and in the prior art should be taken as illustrative only and not as limitative. The present invention is best understood by reference to the appended drawings in which:

FIG. 2 is a schematic diagram illustrating the relative timing between a transmitter firing and a receiver receiving acoustic signals in a long spaced acoustic well logging system in accordance with concepts of the present invention; and FIG. 3 is a block diagram illustrating the multiplexed filter acoustic well logging system according to the concepts of the present invention.

DESCRIPTION OF THE PREFERRED EMBODIMENT

Figure 1:
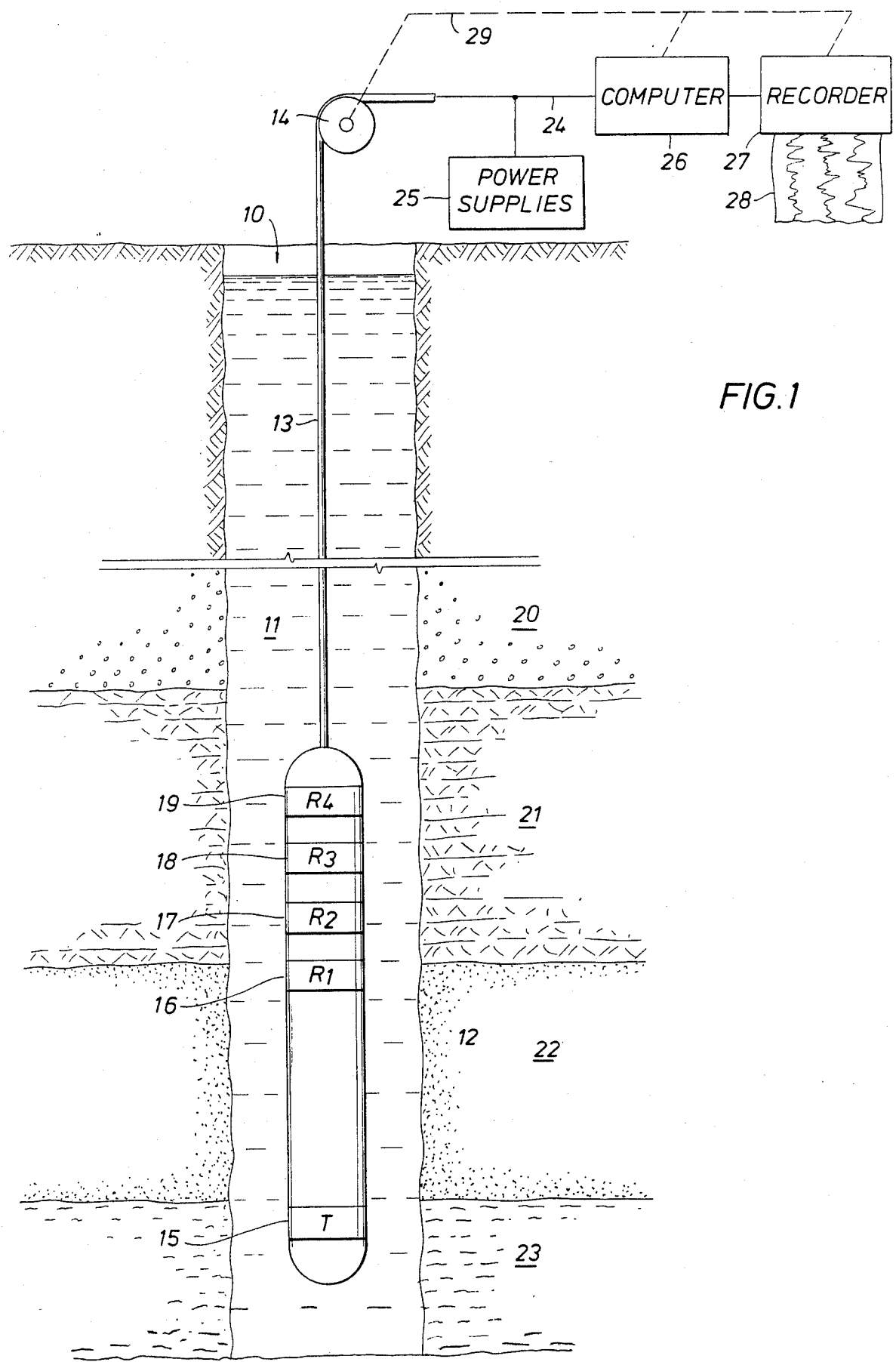
FIG. 1 is a schematic diagram illustrating a well logging system in accordance with concepts of the present invention deployed in a well borehole.

Referring initially to FIG. 1, a well logging system in accordance with the concepts of the present invention is illustrated schematically deployed in a well borehole. A well borehole 10 penetrates earth formations 20, 21, 22 and 23 and is filled with a borehole fluid 11. A well logging sonde 12 is suspended in the borehole 10 by well logging cable 13 of the typical armored single or multiple conductor cable variety known in the art.

The downhole sonde 12 is equipped near the lower end thereof with an acoustic transmitting transducer 15 and with four long spaced acoustic receivers 16, 17, 18 and 19. The acoustic transmitter 15 can be, for example, a high intensity piezoelectric transducer capable of emitting an intense short burst of acoustic energy having a peak energy response in the frequency range between ten and fifteen kilohertz. The spacing from the acoustic transmitter 15 to the nearest acoustic receiver 16 is generally at least ten feet. Acoustic receivers 16, 17, 18 and 19 are spaced on the order of one to two feet apart from each other.

The body of the acoustic well logging sonde 12 is provided with acoustic absorbent material therein to prevent acoustic propagation therethrough. The outer surface of the sonde 12 is provided with slots making the acoustic path length from the transmitter 15 to the closest acoustic receiver 16 extremely tortuous along the body shell of sonde 12, such that the propagation time along the acoustic sonde body 12 is very slow. Electronic instrumentation depicted with more particularity in FIG. 3, is carried within the downhole sonde 12 and serves to control the acoustic transmitter 15 and the processing of received signals at the acoustic receivers 16, 17, 18 ad 19.

When the acoustic transmitter 15 is fired, the acoustic energy emitted by the transmitter travels in the well borehole 10, along the borehole-earth formation interface, and within earth formations 21, 22 and 23 between the acoustic transmitter and receivers 16, 17, 18 and 19. The relatively long separation distance of the acoustic receivers 16–19 from the transmitter 15 enables the separation by difference in propagation time of various modes of acoustic energy as will be explained in more detail subsequently with respect to FIG. 2.

The downhole sonde 12 is suspended in the well borehole 10 by armored well logging cable 13 which passes over a sheave wheel 14 at the surface and is connected to surface equipment which is generally located on a well logging truck or skid unit (not shown). Cable 13 conductor 24 provides an electrical path connecting the downhole equipment to a surface power supply 25 and to a surface computer 26. The output of the processed digitized acoustic wave forms from the downhole sonde 12 is accomplished by computer 26 and supplied to a recorder 27 which may be of the strip chart variety producing a plurality of curves 28 on a record medium or which could be a magnetic tape or disc recorder if desired. The computer 26 and recorder 27 are supplied with depth information of the downhole sonde 12 by being electrically or mechanically coupled to the sheave wheel 14 as illustrated by the dotted line 29. Thus, depth information concerning the depth of the well logging sonde 12 is supplied to the computer 26 and the recorder 27 so that the record medium 28 may be moved as a function of borehole depth and the measurements made by the downhole sonde 12 can be recorded as a function thereof.

Referring now to FIG. 2 a plot of amplitude versus time, with time being of the horizontal axis and the amplitude on the vertical axis is shown for the acoustic transmitter firing wave form and for a typical acoustic wave form received at one of the receivers 16 through 19 of FIG. 1. The piezoelectric crystal transmitter is fired at a time T illustrated at 30 of the drawing. The transmitter transducer is critically damped so that it does not ring, or reverberate, for a long time subsequent to the application of the electrical impulse to it which causes the abrupt firing of the transmitter piezoelectric transducer. After a time lapse sufficient for the different acoustic energy modes to propagate from the transmitter to one of the acoustic receivers, the wave forms of FIG. 2 shows the wave form arriving at a particular receiver 16 through 19 of FIG. 1. The distance through which the acoustic waves have propagated along and inside the borehole and in the formations surrounding the borehole is sufficient to provide a substantial separation of different propagation modes of the acoustic energy. For example a P, or compressional, wave arrival is shown at 31 of FIG. 2 and an S, or shear, wave arrival is shown at 32 of FIG. 2. The receiver wave form continues in time and other acoustic modes are received later in time subsequent to arrival of the shear wave at 32 in FIG. 2. Later arriving modes may include Raleigh waves and tube wave modes of the borehole itself. The full wave form acoustic signal is digitized in the downhole tool as a function of time by an analog to digital converter which will be discussed subsequently. A stream of digital numbers representative of the amplitude of the arriving wave form at a particular receiver as a function of time as transmitted via conductors of the well logging cable 13 of FIG. 1 to the surface computer 26.

As previously discussed, the acoustic transmitter transducer has its peak operating frequency in the range between ten and fifteen kilohertz. Motion of the downhole sonde 12 in the RuGose borehole 10 of FIG. 1 can cause acoustic noise to be generated. Similarly, vibrations of the well logging cable 13 propagated in the borehole can also lead to acoustic noise being generated. This type of noise is generally referred to in the art as "road noise". Road noise may also include electronic noise generated in high gain amplifiers and background electrical noise generated from other sources such as sixty hertz power line frequencies etc. in the vicinity of the well logging equipment.

Because it is desirable to digitize the received acoustic wave form in as much detail as possible, (usually a four to six microsecond digital sampling rate is used which can capture details of acoustic arival signals at frequencies up to 40 or 50 kilohertz) it is desirable to amplify the received signals across as wide a band width as possible and to supply these signals to the digitizer.

Referring now to FIG. 3 a block diagram is shown which illustrates a multiplexed filter acoustic well logging system according to the concepts of the present invention. It will be noted in FIG. 3 that the lighter lines represent the travel path of analog signals and the heavy black lines represent the travel path of digital signals. An operating cycle of the system begins with the transmission of a transmitter fire control signal on line 51 to the transmitter/transducer 40 from a real time digitizer control circuit 50. The real time digitizer control circuit 50 which will be discussed in more detail subsequently, also supplies control signals to a multiplexer 45 an automatic gain control amplifier 46 and an analog to digital converter 47. The control signals are supplied to the multiplexer 45 via control line 52. The control signals are supplied to the automatic gain control amplifier 46 via control line 53. Timing signals are supplied to the A-D converter 47 via control line 54.

Similarly, the real time digitizer control circuit 50 is supplied with input signals from a computer processor 49 via a filter position control line 55 and a gain control line 56. The processor 49 also supplies telemetry output data via an output line 57 to a telemetry system contained within the downhole sonde 12 of FIG. 1 for transmission to the surface on conductors of cable 13 of FIG. 1.

Upon receipt of the transmitter fire control signal via line 51 the transmitter/transducer 40 of FIG. 3 is fired and produces an acoustic impulse signal similar to that of 30 of FIG. 2 which propagates various modes of acoustic energy both inside and outside the well borehole 10 of FIG. 1. An acoustic receiving transducer 41 spaced approximately ten or more feet from the transmitter 40 receives the acoustic signal after an elapsed time sufficient to allow the transmission of the compression mode signal which is normally the fastest propagating acoustic signal, and which is illustrated schematically at 31 of FIG. 2. The receiver 41 produces an analog output signal to a preamplifier 42.

The acoustic receiver 41 may comprise a piezoelectric crystal which is sensitive to acoustic energy over a wide range of frequencies. The preamplifier 42 is a wide band amplifier which operates at maximum gain all the time and serves to preamplify the relatively weak signals received from acoustic receiver 41. The output of preamplifier 42 is supplied to two high-pass filters 43 and 44. High-pass filter 43, which is utilized after the arrival of acoustic P waves are detected at the receiving transducer, comprises a 750 hertz high-pass filter which pass all frequencies above 750 hertz to its output. Similarly, high pass filter 44 comprises a filter which passes all frequencies above approximately 7.5 kilohertz to its output. The outputs of both filters 43 and 44 are supplied to the multiplexer 45 as inputs.

The multiplexer 45 supplies only one output signal an analog signal from the downhole receiver 41. This signal is supplied to an automatic gain controlled amplifier 46. The amplifier 46 comprises a wide dynamic range, gain ranging amplifier which is under the control of the real time digitizer control circuit 50 via the gain control signal supplied on line 53. The automatic gain control amplifier 46 supplies its output signal in analog form to the analog to digital converter 47.

Converter 47 receives timing pulses via line 54 from the real time digitizer control circuit 50 and serves to sample the amplitude of the signal supplied to it by automatic gain control amplifier 46 as a function of time and to produce a digital number representative of the amplitude of the signal at each point in time that it receives a timing signal from the real time digitizer control circuit 50. In typical operation the timing signals are supplied on line 54 approximately every four to six microseconds and the amplitude of the acoustic wave form is sampled and digitized at this rate.

The digital numbers representative of the amplitude as a function of time of the arriving acoustic wave form are supplied via a bus to random access memory 48. This bus comprise a conventional serial RS 232 computer interface bus for example or could comprise a parallel bus, if desired. The contents of RAM memory 48 are sampled via a second bus by the microprocessor 49 which can perform logic functions and make decisions with respect to the data it is processing.

The microprocessor 49 under program control examines the digital representation of the arriving acoustic receiver wave from. When it determines, by either a process of zero crossing or peak detection, that the P wave acoustic signal 31 of FIG. 2 has arrived at the downhole receiver 41, the microprocessor 49 supplies a filter position output signal on line 55 to the real time digitizer control circuit 50. The control circuit 50 supplies a filter select signal to the multiplexer 45 which controls the selection of either filter 43 or 44. The initial selection is of 7.5 kilohertz filter 44. Filter 44 is used during the time period between the firing of the transmitter until microprocessor 49 detects the arrival of the P wave signal at the receiver 41. When P wave arrival occurs the output corresponding to filter 43, the 750 hertz high-pass filter is selected by the digital control circuit and multiplexer 45.

It has been observed in practice that the use of the 7.5 kilohertz filter 44 during the time interval between transmitter firing and the detection of the P wave provides for easier detection of the P wave signal. The P wave signal arrives having a frequency content similar to that of the output of the transmitter/transducer 40. This transducer has, as previously described, its output frequency centered between ten and fifteen kilohertz. Thus, only relatively higher frequencies above 7.5 kilohertz are necessary to be present in the wave form for the processor 49 to be able to detect the arrival of the incoming P waves at the receiver transducer.

Once the 750 hertz filter has been selected, the multiplexer outputs analog signals representative of all frequencies above 750 hertz arriving at the receiver transducer 41 to the automatic gain control amplifier 46 and the analog to digital converter 47.

The processor 49 also samples the amplitudes of the digital signals in random access memory 48 and supplies a gain control signal to the auto-gain amplifier 46 via real time digitizer control circuit 50 and gain control line 53. Thus if the amplitudes of the signals in the memory 48 start to fall to too low a level, for example due to the arrival of P wave signals through hard rock formations, the gain of automatic gain controlled amplifier 46 can be increased correspondingly to render the amplitude of the signal more satisfactory for performance of the analog to digital converter 47.

The processor 49 continuously scans the memory buffer and searches for the arrival of the P wave signal. The arrival time from a previous firing may be used to predict when the first arrival for a current transmitter firing will occur. Several sample times can be added onto this measurement to account for the maximum theoretical shift in transit time at normal logging speeds and firing times thus providing the microprocessor 49 with the capability of making a very rapid selection and detection of the arriving P wave or compressional signal at 31 of the wave form of FIG. 2.

Generally, it has been required in the prior art to make separate passes or logging runs in a well in order to obtain information having different frequency response characteristics over a given interval of formation. With the system of the present invention it is possible to make both acoustic velocity logging runs having optimal performance and acoustic full wave signal recording runs having optimum high fidelity response at the same time. The selection and multiplexing of an appropriate high-pass filter in pre-processing the data downhole is very useful for this purpose. This downhole processing and filter selection can also lead to a reduction in the requirements placed on the surface computer 26 for digital filtering of the signal prior to its processing therein and recording on a surface recorder 27.

Supplying the signal to the downhole processor with less road noise present results in more accurate downhole first arrival detection by the processor 49. The shift of frequency content of the output signals from the amplifiers, upon detection of the first arrival, is also important since it boosts low amplitude compressional and shear components arriving later in the wave form by supplying the higher frequency content signals to the A-D converter 47 for conversion into digital form.

The foregoing descriptions may make other alternative embodiments of the present invention apparent to those of skill in the art. It is therefor the aim of the appended claims to cover all such changes and modifications as fall within the true spirit and scope of the invention.

What is claimed is:

1. A downhole well logging system including a fluid tight sonde sized and adapted for passage through a well bore for use in acoustic well logging for acoustic travel time measurement and full waveform acoustic signal processing comprising:
   means housed in said sonde for generating a high frequency content acoustic signal having a peak energy content in the frequency range from 10 to 15 kilohertz and having several propagation modes in a well borehole;

means housed in said sonde and spaced longitudinally from said signal generating means by at least an 8 to 10 foot spacing distance, for detecting arriving acoustic energy signals propagated through a well borehole and for generating analog electrical signal waveforms representative thereof;

selectable analog high pass filter means housed in said sonde for supplying, in response to a control signal, selectably filtered representations of said representative analog waveform electrical signals as input to an analog to digital converter for conversion to digital form; and means housed in said sonde and responsive to signals output from said analog to digital converter, for generating said control signal to said selectable filter means, said control signal generating means having digital logic means for detecting the arrival of compressional wave acoustic modes at said detecting means and generating a control signal to change the frequency response of said selectable filter means subsequent thereto from a higher frequency cutoff limit to a lower frequency cutoff limit.

2. The system of claim 1 wherein said selectable analog filter means comprise high pass filters having cut off frequencies differing by approximately one order of magnitude.

3. The system of claim 2 wherein said filters comprise a first filter having a high pass response and a lower cut off of approximtely 7.5 kilohertz.

4. The system of claim 3 wherein said filters additionally comprise a second filter having a high pass response and a lower cut off frequency of approximately 750 hertz.

5. The system of claim 4 wherein said means for generating said control signal includes random access memory (RAM) means.

6. The system of claim 5 wherein said means for generating said control signal further includes microprocessor means responsive to said RAM memory means and capable of operating under program control.

7. The system of claim 6 wherein said microprocessor means operates under program control to determine a response to the contents of said RAM memory means, the arrival of compressional P waves at said detecting means and generates a control signal for changing said selectable filters in response to said detection of said P waves.

8. The system of claim 7 wherein said microprocessor means generates said control signal in response to the arrival of P waves at said detecting means to select said 750 hertz cutoff high gross filter means instead of said 7.5 kilohertz cutoff high pass filter means.

9. The system of claim 8 and further including a real time digital control circuit responsive to output signals from said microprocessor means for generating timing signals to said analog to digital converter and said selectable filter means.

10. The system of claim 9 and further including an autogain ranging amplifier means connected between the output of said selectable filter means and said analog to digital converter means and responsive to gain change signals from said real time digital control circuit.

* * * * *